United States Patent
Cupler, II

[15] 3,688,075
[45] Aug. 29, 1972

[54] MECHANICAL/NONMECHANICAL MACHINING CENTER

[72] Inventor: John A. Cupler, II, 10 Cupler Dr., Cumberland, Md. 21502

[22] Filed: Dec. 21, 1970

[21] Appl. No.: 100,060

[52] U.S. Cl.................219/121 EB, 408/236, 408/22
[51] Int. Cl. ..............................................B23k 15/00
[58] Field of Search ...408/24, 44, 46, 32, 11 F, 18 F; 29/564, 566; 219/121 R, 121 EB, 121 EM, 69 R, 69 U, 69 P, 69 E, 69 M

[56] References Cited

UNITED STATES PATENTS 3,350,774   11/1967   Bridges, Sr. ..................29/564
3,435,185   3/1969   Gerard ................219/121 ER

*Primary Examiner*—R. F. Staubly
*Assistant Examiner*—Gale R. Peterson
*Attorney*—Colton and Stone

[57] ABSTRACT

A combination of mechanical and non-mechanical machining capabilities are integrated into a single machining center. Both the mechanical and the non-mechanical machining equipment are mounted for selective movement between a non-working position completely clearing the work area and a working position for conducting machining operations along a common centerline.

6 Claims, 4 Drawing Figures

INVENTOR
JOHN A. CUPLER, II

INVENTOR
JOHN A. CUPLER, II

BY Colton & Stone

ATTORNEYS.

MECHANICAL/NONMECHANICAL MACHINING CENTER

Non-conventional machining techniques, i.e. those in which machining operations are effected by other than workpiece removal through direct engagement with a driven machine tool, represent a relatively recent innovation which has found increasing acceptance in the machining industry with the expanded development and use of the more difficultly machinable space age alloys such as exemplified by the nickel base superalloys, for example. Exemplary of the class of machining techniques commonly referred to as "non-conventional" are electron beam, laser, fluent abrasive and ultrasonic machining. All of these techniques have been highly developed in their own right and each includes characteristic advantages as well as certain inherent limitations precluding their use alone or in exclusive combination with other non-conventional machining equipment as a complete machining center. Virtually all the characteristic limitations of the various non-conventional machining techniques may be, and at present are, cured by either a prior or subsequent conventional machining operation. In many instances the conventional machining operation is critical to the achievement of a satisfactory work product and, in others, it represents the most economical method of performing a preliminary on finishing operation.

Illustrative of the foregoing are the formation of small cooling holes in gas turbine blades and vanes and the formation of shaped holes in general fabrication techniques. In the case of "cool turbine" work, i.e. that phase of gas turbine engineering concerned with temperature control of the blades and vanes; many turbine specifications require the formation of hundreds of small holes in each blade and vane. These blades and vanes are typically fabricated from advanced, cast superalloys which are among the metallurgically toughest and hardest materials known to man. While such materials may be readily "drilled" by an electron beam or laser such a part so "drilled" is not usable in the contemplated environment. This for the reason that the intense heat generated as an electron beam or laser "drills" a workpiece creates a recast layer about the hole which may include hair line cracks subjecting the blade or vane to the likelihood of crack elongation and rupture under the typical operating conditions of a gas turbine engine. An additional limitation in this particular environment which, though not likely to cause the disastrous consequences of blade or vane failure, is no less fatal to the design parameters of the engine is the fact that the "vaporized" holes formed by electron beam or laser "drilling" do not possess reproducible flow characteristics. Thus, the molten metal surrounding each hole does not solidify in the same pattern and the bore walls are, of course, not smooth. The foregoing limitations on electron beam and laser "drilling" may be cured by a subsequent mechanical reaming operation to remove the recast area and produce a smooth bore wall to reproducible dimensions in the manner more fully set out in applicant's copending application Ser. No. 171,004 filed Aug. 11, 1971 which is a continuation of application Ser. No. 800,237 filed Feb. 18, 1969, now abandoned.

Similarly, in the formation of shaped holes by fluent abrasive of ultrasonic "drilling," it is desirable to first form a pilot hole through which the fluent material used in conjunction with the shaping operation may escape. This is normally achieved by a prior conventional drilling operation.

Since the introduction of Vee drilling techniques in the late 1940's it has been possible to define a unique work axis definitive of the centerline of any subsequently used tool. The manner in which this is accomplished is more fully set out in U.S. Pat. No.s 2,607,244 and 3,478,419. Basically, a unique axis of tool rotation is defined by a fixed, open Vee bearing which has no moving parts thus totally eliminating those eccentricities necessarily inherent in all chucked tools. A subsequent exchange of non-captive tools having identical spindle diameters in the same Vee bearing thus necessarily rotate true along the same centerline. A fuller discussion of the absolute precision obtainable in the just described conventional tool changing operation appears in the aforesaid U.S. Pat. No. 3,478,419 whose disclosure represents the precision standards for microdrilling where absolute concentricity along a unique work axis is critical to any multiple work operation at the same workpiece positionment. For example, in a typical progressive step tool change operation as defined in applicant's copending application Ser. No. 786,344 filed Oct. 23, 1968, now U.S. Pat. No. 3,570,330 multiple sequential counter-sinking and counter-boring operations may be conducted along the same centerline to drill a single bore having a diameter of 0.0001 inch. It is thus obvious that the infeed axis for each tool must be common and uniquely defined to avoid that drill breakage which inevitably occurs when the slightest lateral forces are imposed upon tools of this size.

In order to "marry" the conventional machining technique just discussed with the previously mentioned non-conventional techniques; it is desirable that the work axis for the non-conventional machining equipment, also, be uniquely positionable in coincidence with that of the conventional machining equipment. Thus, assuming it is desired to form a turbine blade cooling hole by first "drilling" a pilot hole with an electron beam and then reaming the same by conventional methods, it is apparent that the work axis must be identical to assure complete removal of the recast layer within the smallest overall bore size.

Inasmuch as electron beam drilling presents substantial problems due to its bulk and required vacuum environment which do not characterize certain other non-conventional machining techniques, the electron beam will be discussed for purposes of illustration. It might appear that a first pilot hole could simply be "drilled" with an electron beam and then subsequently reamed in any desired manner as, indeed, it may if precision machining is not required and if time requirements are not critical. The concept of an integrated machining center is, however, herein contemplated as one in which the same precision is available as is presently achieved with Vee machining centers of the type previously discussed and wherein both conventional and non-conventional tools may be interchanged, either manually or automatically, within reasonable time periods on the same machining center. Thus, in the practice of the invention, the workpiece is maintained stationary while both the conventional and non-conventional machining operations are being performed and both the conventional and non-conventional equipment are movable into and out of machining positions relative to the workpiece against fixed machining equipment positionments which, each, individually define a common work axis. Because of the great bulk of the electron beam and particularly its vacuum requirement, it is necessary that the total work area be cleared in order to position the electron beam equipment if the workpiece is not to be moved. Similarly, it is necessary that all of the electron beam equipment be removed from the work area prior to the performance of a conventional machining operation.

This is achieved, basically, by the mounting of each type machining equipment for movement between remote non-working positions completely clearing the work area and working positions defined by fixed equipment positionments. In the case of the conventional machining equipment, the use of bearings containing no moving parts, such as open Vee bearings, are critical for microprecision work since the eccentricity inherent to chucked tools would defeat the purpose of fixed stop positionments. In its broader implications, however, and where absolute precision is not required the invention encompasses the broad concept of the alternate selective movement of conventional and non-conventional machining equipment into and out of machining position on a common machining center.

Preferably, a machining center of the type disclosed in applicant's copending application Ser. No. 95,678 filed Dec. 7, 1970 is mounted for pivotal movement, through approximately 90°, between a working position overlying a work area and a non-working position displaced therefrom. The electron beam machining equipment is mounted on guide ways for linear movement between a working position overlying the work area and a non-working position remote therefrom. The vacuum equipment may be integrated with the electron beam machining equipment for movement therewith or separate therefrom and moved vertically into position. It is the complete clearance of the work area by the conventional equipment that makes this possible.

Figure 1:
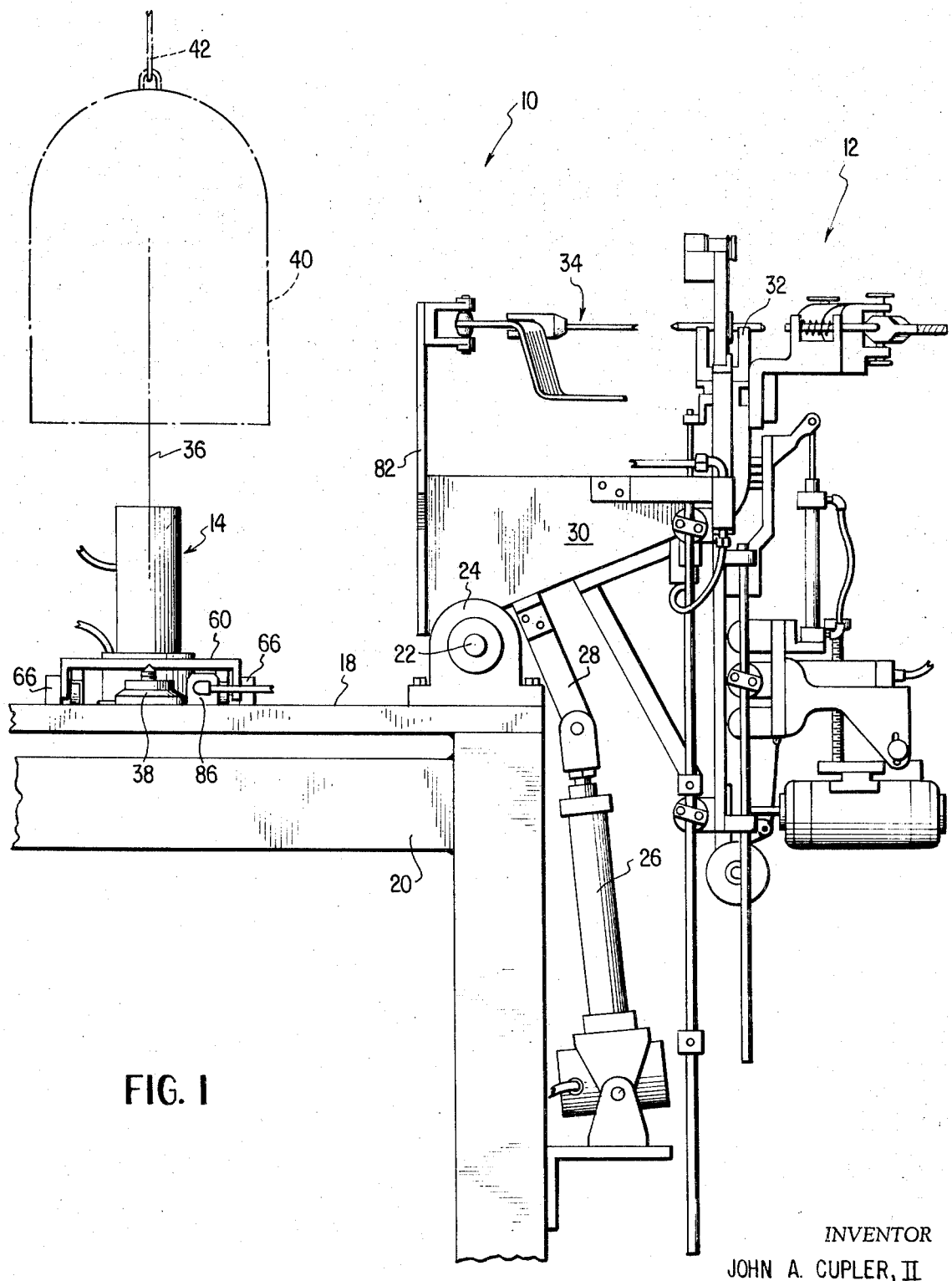
FIG. 1 is an elevational view of a conventional/non-conventional machining center showing the conventional machining equipment in non-working position clearing the work area and the non-conventional machining equipment in working position.
Figure 4:
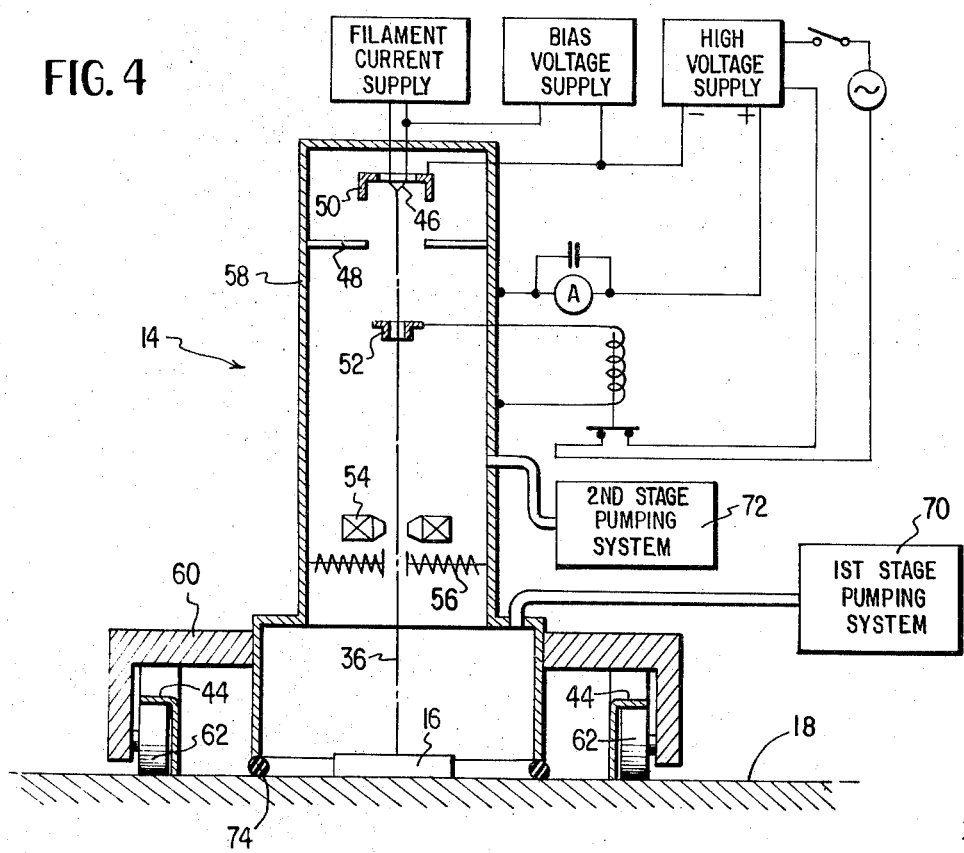
FIG. 4 is a vertical sectional view taken along line 4—4 of FIG. 2.

The machining center 10 depicted in its entirety in FIG. 1 includes a Vee drilling machine 12 constituting the conventional or mechanical machining equipment in a non-working position and the non-conventional or electron beam drilling equipment 14 in machining position relative to a workpiece 16 (FIG. 4) positioned on the upper work surface 18 of table 20.

Figure 2:
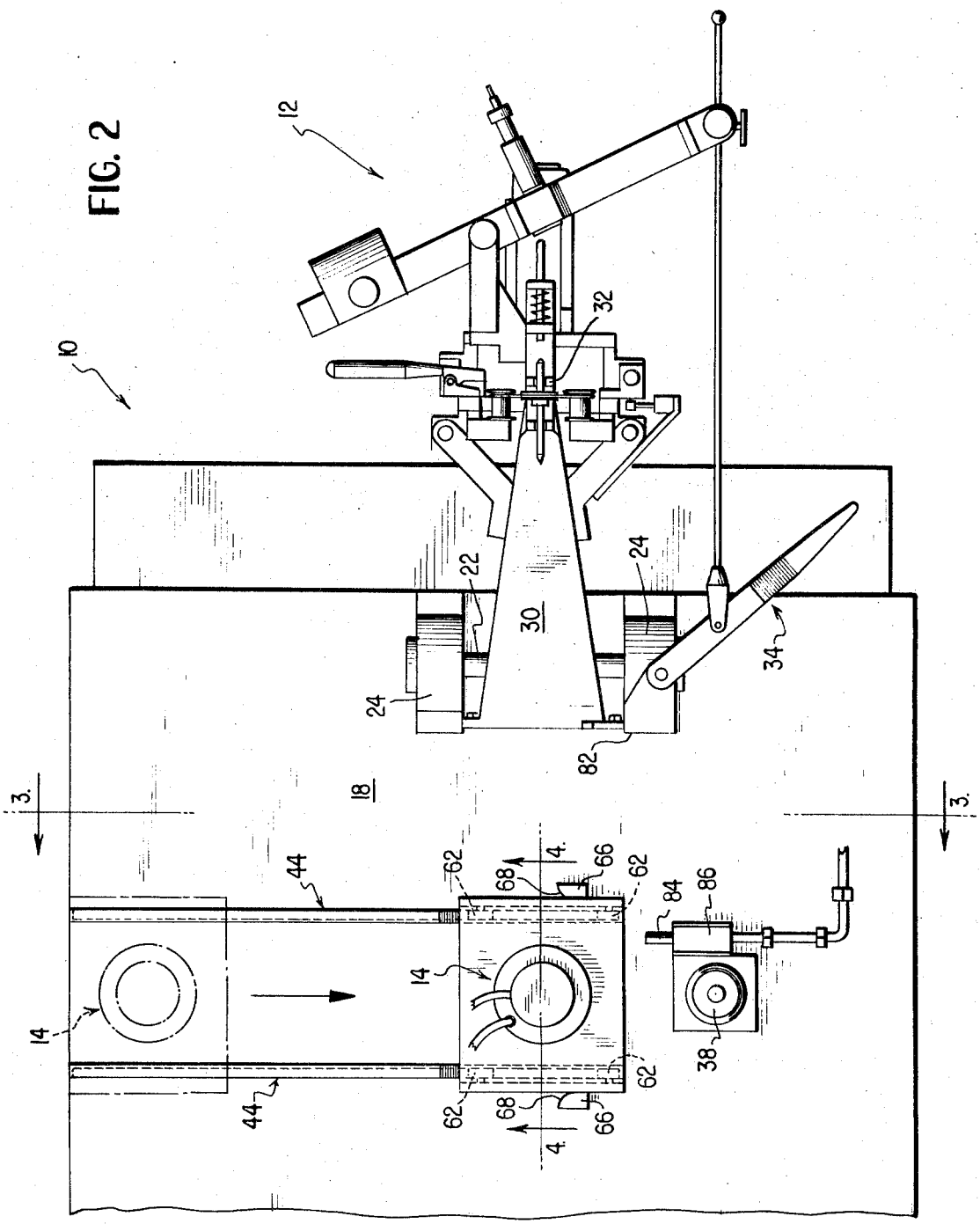
FIG. 2 is a top plan view thereof.

Vee drilling machine 12 is mounted on table 20 for pivotal movement about the axis of shaft 22 between the non-working position shown in FIGS. 1 and 2 and a working position displaced approximately 90° therefrom overlying surface 18. Shaft 22 is journalled in bearing blocks 24 rigidly mounted on the upper surface of table 20 and a conventional double acting air motor 26 interconnected between a lower portion of table 20 and a bracket 28 secured to base 30 of drilling machine 12 controls the selective movement of the drilling machine between the working and non-working positions. The details of drilling machine 12 comprise the subject matter of applicants's copending application Ser. No. 95,678 filed Dec. 7, 1970 and reference may be had thereto for a complete description of the same. Suffice to state that Vee bearing 32 defines an axis of tool rotation which, in the working position of drilling machine 12, is perpendicular to work surface 18. A conventional manual infeed mechanism 34 is used to control tool infeed in the usual manner along work axis 36 which is coincident with the axis of tool rotation defined by bearing 32. A micrometer depthing gauge 38 is secured to the upper surface 18 of table 20 at a location remote from work axis 36 as is a locking mechanism for locking drilling machine 12 in the working position.

It is an important feature of the invention that all of the drilling machine 12 which overlies the work area is moveable to a non-working position completely clearing the same so that additional equipment in the form of non-conventional machining equipment herein illustrated as an electron beam may be moved into working position not only along a horizontal axis but also along a vertical axis. In this latter connection, reference is had to the use of a vacuum bell 40 which may be vertically lowered into position over the electron beam equipment 14 by means of a suitable controlled cable 42 or the like following the horizontal movement of electron beam 14 into working position along tracks 44 as illustrated in FIGS. 1 and 2, respectively.

A second important feature of the invention resides in the fixed positionments for both the conventional and non-conventional equipment so that the same work axis is defined for both types of machining operations. This latter feature has utility separate and distinct from the former since, in those situations where less than perfect alignment can be tolerated such as in machining operations to fairly coarse tolerances, the electron beam equipment could be used without its precise positionments but if and only if the work area surrounding the workpiece had been cleared so that a vacuum could be drawn and the area above the workpiece similarly cleared to permit moving this rather bulky equipment into that area previously occupied by drilling machine 12. In such case, and particularly where vacuum bell 40 is to be used as opposed to the alternate method of evacuating the work area for electron beam machining to be subsequently described; the tracks 44 may be eliminated or formed as hardened inserts flush with work surface 18 to facilitate sealing about the bottom of bell 40.

In the preferred mode of operation, the vacuum equipment is integrated with the electron beam equipment for horizontal movement therewith along tracks 44 into and out of working position.

Figure 3:
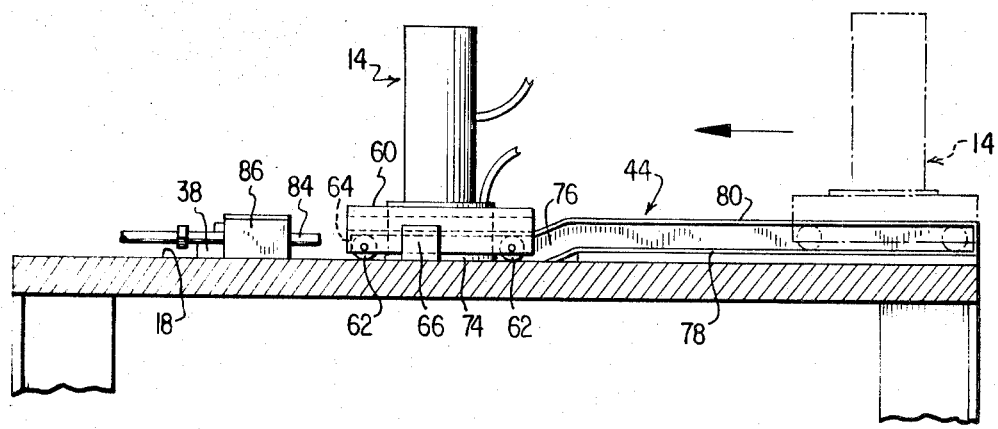
FIG. 3 is a sectional view taken along the line 3—3 of FIG. 2.

The electron beam machine includes the usual cathode 46, anode 48, control electrode 50 such as a Wehnelt cylinder more fully described in U.S. Pat. No. 2,771,568 to K.H. Steigerwald, an annular diaphragm 52, magnetic focussing leans 54 and deflection coils 56 whereby the electron beam may be directed along an axis coincident with the axis of the machine and work axis 36. The remaining electrical controls are entirely conventional as will be understood by those skilled in the art. The housing 58 of the electron beam machine is integrally mounted on a wheeled carriage 60 whose wheels 62 engage tracks 44 and provide precise positionment of the electron beam axis in the solid line position of FIG. 2 by virtue of the abutment of the front wheels 62 with fixed wheel stop positionments 66 just outboard 64 formed integrally with the track. Fixed lateral positionments 66 just outboard of tracks 44 include leading cam surfaces 68 to assure the correct lateral positionment of the electron beam. Housing 58 is evacuated by conventional vacuum equipment carried by carriage 60 schematically indicated in FIG. 4 as comprising primary and secondary systems 70, 72. An annular seal 74 is secured to the open lower end of housing 58 to seal the interior thereof in the working position as will be apparent from an inspection of FIG. 4. It will be noted that tracks 44 include an inclined section 76 at which point the wheel supporting surface 78 thereof is terminated while the flange portion and overlying track portion 80 is continued to terminate in the fixed stop positionment 64. Thus, as the electron beam equipment moves from right to left as viewed in FIG. 3, the front carriage wheels will pass down inclined track section 76 to engage upper work surface 18 while simultaneously deforming the forward portion of the relatively large soft annular seal 74. As the carriage continues to move to the left, seal 74 is progressively deformed about its periphery as the rear carriage wheels 62 come to rest on surface 18. During the last portion of carriage movement firmly against stops 64, seal 74 is totally deformed in sealing engagement between surface 18 and housing 58. As will be apparent from FIG. 2, this latter carriage movement occurs between lateral guides 66 which, in conjunction with stops 64, assure the correct positionment of the electron beam equipment.

Housing 58 is thereafter evacuated and workpiece 16 machined as by the electron beam drilling of a pilot hole to be subsequently reamed by the conventional drilling machine 12. Upon completion of the electron beam machining step, housing 58 is vented and carriage 60 is moved from left to right as viewed in FIG. 3 against the frictional resistance imposed by the deformed seal 74 until the carriage is fully supported upon the wheel supporting track portion 78 and, finally, to the phantom line position of FIG. 3 completely clearing the work area surrounding and above workpiece 16. In the event that the vacuum bell 40 had been used, such as by omitting seal 74 and tracks 44, the same would be vertically moved above the position shown in FIG. 1. Motor 26 is thereafter actuated to pivot drilling machine 12 counter-clockwise, as viewed in FIG. 1, to bring the axis of tool rotation defined by Vee bearing 32 into coincidence with work axis 36 and the flange 82, integral with base 30, into engagement with surface 18. A pneumatically actuated locking bar 84 is there after extended from cylinder 86 into locking position on the upper surface of flange 82. A mechanical drilling or reaming operation may then be performed on workpiece 16 along work axis 36 in the matter more particularly described in the aforesaid copending application Serial No.

In many instances it is possible to support diverse types of non-conventional machining equipment directly in Vee bearing 32 so that it is unnecessary to pivot drilling machine 12 to the non-working position of FIG. 1 in order to interchange conventional and non-conventional machining equipment and assure that the non-conventional machining operation will be conducted along the same work axis. Exemplary is the disclosure in applicant's copending application Ser. No. 171,004 filed Aug. 11, 1971 which is a continuation of application Ser. No. 800,237 filed Feb. 18, 1969, now abandoned, showing the manner in which a laser beam may be directed along the desired work axis by the utilization of an optical "tool" supported in bearing 32. Similarly, a rigid elongated nozzle having a flexible fluent material supply conduit connected thereto may be formed with a cylindrical diameter equal to that of a Vee bearing supported mechanical machining tool and interchanged with the same in bearing 32 after the manner of tool interchange described in the aforesaid copending application Ser. No. 117,004. Additionally, the probe of an ultrasonic machining tool may be formed to engage bearing 32.

In view of the foregoing, it will be appreciated that any non-conventional machining equipment may be used with the conventional equipment 12 either by substitution in bearing 32 or completely removing machine 12 from the work area following which time the non-conventional equipment may be used in a manner previously known.

The practice of the invention not only makes possible the performance, with a single machining center, of those diverse work operations that have previously been separately performed but, also, opens up a whole new field of potential sales for non-conventional equipment manufacturers. Thus, in the past, the high cost and limited applicability of non-conventional machining equipment has virtually prohibited their use by small machine shops since their primary business depends on those machining operations which can only be performed by mechanical machining. Such small machine shops have not, therefore, previously been considered as potential customers. Such a potential market has now become feasible with the "marriage" of conventional and non-conventional machining techniques in a single machining center.

It is obvious that all of the previously described mechanical movements as well as the activation and deactivation of the non-conventional machining equipment may be carried out in semi-automatic or completely automatic fashion under tape control programming or the like.

What is claimed is:

1. A machining center, comprising; a work station adapted to support a workpiece for mechanical and non-mechanical machining operations thereon along a common work axis; bearing means defining an axis of mechanical tool rotation; drive means for rotating a tool in said bearing about said axis of tool rotation; tool infeed means for infeeding said tool along said axis of tool rotation; first and second stop means on said machining center; a machine base mounted on said machining center for movement relative to said work station between a working position intersecting said work axis and engaging said first stop means and a non-working position remote from said work axis; said machine base mounting said bearing means, drive means and infeed means thereon for movement therewith between said working position aligning said axis of tool rotation with said work axis and said non-working position remote therefrom; non-mechanical machining equipment including means defining a non-mechanical machining axis; means mounting said non-mechanical machining equipment on said machining center for movement between a working position intersecting said work axis and engaging said second stop means and a non-working position remote from said work axis; and said non-mechanical machining axis coinciding with said work axis in the working position of said non-mechanical machining equipment.

2. The machining center of claim 1 wherein said non-mechanical machining equipment includes electron beam equipment; said last named means comprising track means; and guide means mounted adjacent said track means for positioning the axis of the electron beam equipment along said work axis.

3. The machining center of claim 2 wherein said equipment includes seal means adapted to engage said work station and vacuum means for evacuating said equipment.

4. The machining center of claim 3 wherein said bearing means comprises an open bearing.

5. The machining center of claim 1 wherein said last named means includes pivot means and said movement between working and non-working positions comprises pivotal movement of said base through approximately 90° whereby the area surrounding said work axis is cleared.

6. The machining center of claim 5 wherein said bearing means comprises an open bearing; guide means mounted on said machining center for guiding non-mechanical machining equipment into and out of machining position relative to said work station; and non-mechanical machining equipment supported on said guide means.

* * * * *